United States Patent
Fontanel et al.

(10) Patent No.: US 11,773,747 B2
(45) Date of Patent: Oct. 3, 2023

(54) DEVICE FOR DETECTING COOLING ABNORMALITIES FOR AN AIRCRAFT TURBINE ENGINE

(71) Applicant: SAFRAN AIRCRAFT ENGINES, Paris (FR)

(72) Inventors: Eddy Stephane Joel Fontanel, Moissy-Cramayel (FR); Matthieu Etienne Attali, Moissy-Cramayel (FR); Gerard Philippe Gauthier, Moissy-Cramayel (FR); Wilfried Lionel Schweblen, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/759,351

(22) PCT Filed: Jan. 15, 2021

(86) PCT No.: PCT/FR2021/050069
§ 371 (c)(1),
(2) Date: Aug. 9, 2022

(87) PCT Pub. No.: WO2021/148740
PCT Pub. Date: Jul. 29, 2021

(65) Prior Publication Data
US 2023/0052526 A1     Feb. 16, 2023

(30) Foreign Application Priority Data
Jan. 24, 2020  (FR) ........................ 2000693

(51) Int. Cl.
*F01D 25/12* (2006.01)
*F01D 5/08* (2006.01)
*F01D 5/30* (2006.01)

(52) U.S. Cl.
CPC ............. *F01D 25/12* (2013.01); *F01D 5/081* (2013.01); *F01D 5/3007* (2013.01); *F05D 2270/303* (2013.01)

(58) Field of Classification Search
CPC .......... F01D 25/12; F01D 25/081–088; F01D 25/08; F01D 5/3007; F01D 5/30; F01D 21/00; F05D 2270/42; F01C 7/18
See application file for complete search history.

(56) References Cited

U.S. PATENT DOCUMENTS 10,684,149 B2 *  6/2020  Koenig ................... F01D 9/065
10,900,378 B2 *  1/2021  Smoke ...................... F01D 9/04
(Continued)

FOREIGN PATENT DOCUMENTS

DE    20 2011 109 225 U1    4/2012
EP          1 832 712 A1    9/2007
(Continued)

OTHER PUBLICATIONS

International Search Report dated Jun. 24, 2021 in PCT/FR2021/050069 filed on Jan. 15, 2021 (citing references 15-18 therein, 2 pages).
(Continued)

*Primary Examiner* — Todd E Manahan
*Assistant Examiner* — Rodolphe Andre Chabreyrie
(74) *Attorney, Agent, or Firm* — Oblon, McClelland, Maier & Neustadt, L.L.P.

(57) ABSTRACT

A turbine rotor for aircraft turbine engine includes a mobile disc supporting mobile blades, the mobile disc including a plurality of slots into which are inserted the roots of the mobile blades a passage being formed between the bottom of the slots and the roots of the mobile blades inserted into the slots. The rotor also includes a circulation channel configured to allow circulation of fluid, the circulation
(Continued)

channel including the passage, and a calibration device configured to allow the flow of a first fluid flow rate in the circulation channel when the temperature within the channel is less than a predetermined temperature threshold value, and to change state so as to allow the flow of a second fluid flow rate, greater than the first flow rate, in the channel, when the temperature within the channel is greater than or equal to said predetermined threshold value.

10 Claims, 3 Drawing Sheets

(56) References Cited

U.S. PATENT DOCUMENTS

| 11,248,490 B2* | 2/2022 | Galle | F02C 7/125 |
| 2022/0065119 A1* | 3/2022 | Snyder | F01D 17/14 |
| 2023/0107761 A1* | 4/2023 | Negri | F01D 5/082 |
| | | | 415/151 |

FOREIGN PATENT DOCUMENTS

| EP | 2 438 273 | 4/2012 |
| FR | 3 077 327 A1 | 8/2019 |

OTHER PUBLICATIONS

Preliminary French Search Report dated Sep. 7, 2020 in French Application 2000693 filed on Jan. 24, 2020 (citing references 15-18 therein, 3 pages).

* cited by examiner

[Figure 1]
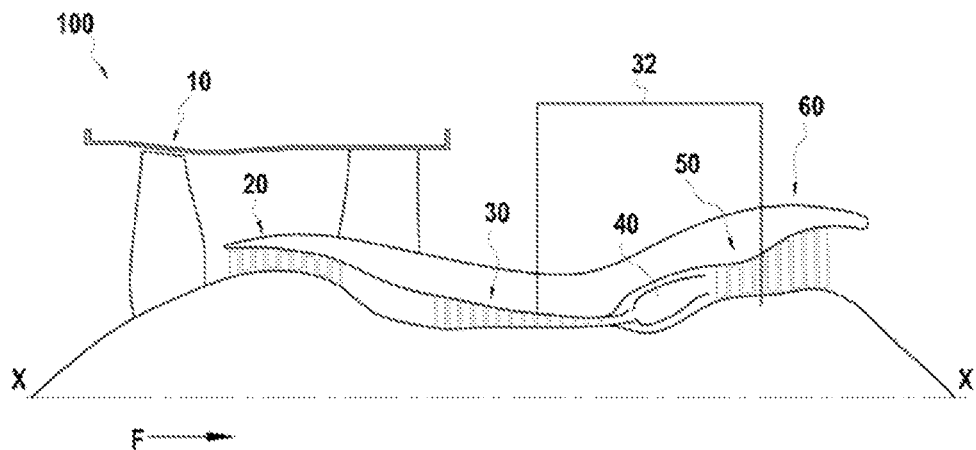
[Figure 2]
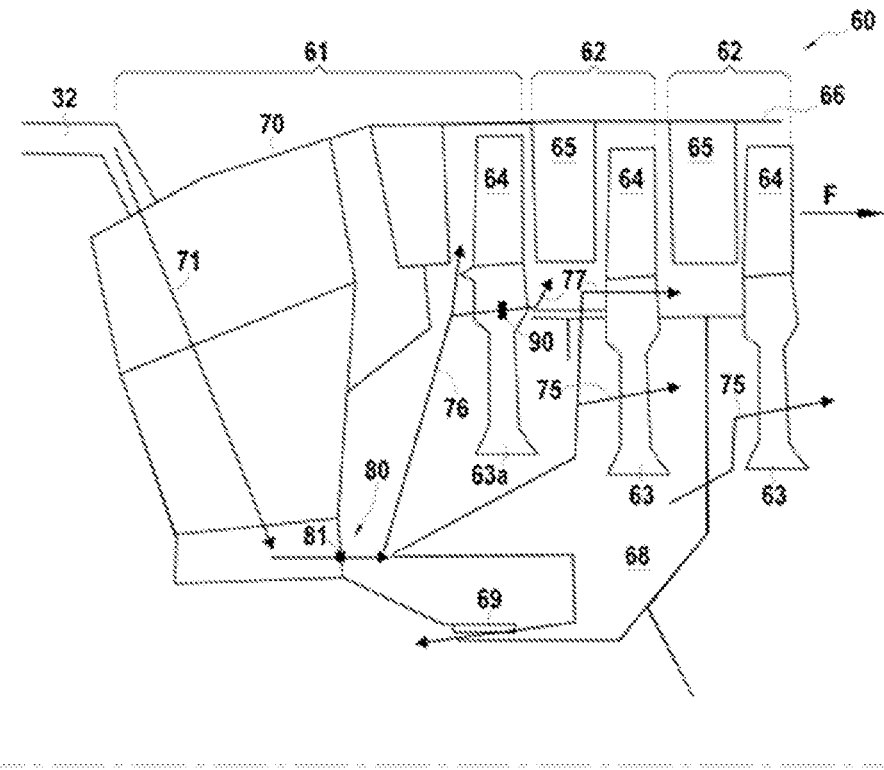

[Figure 3A-3B]
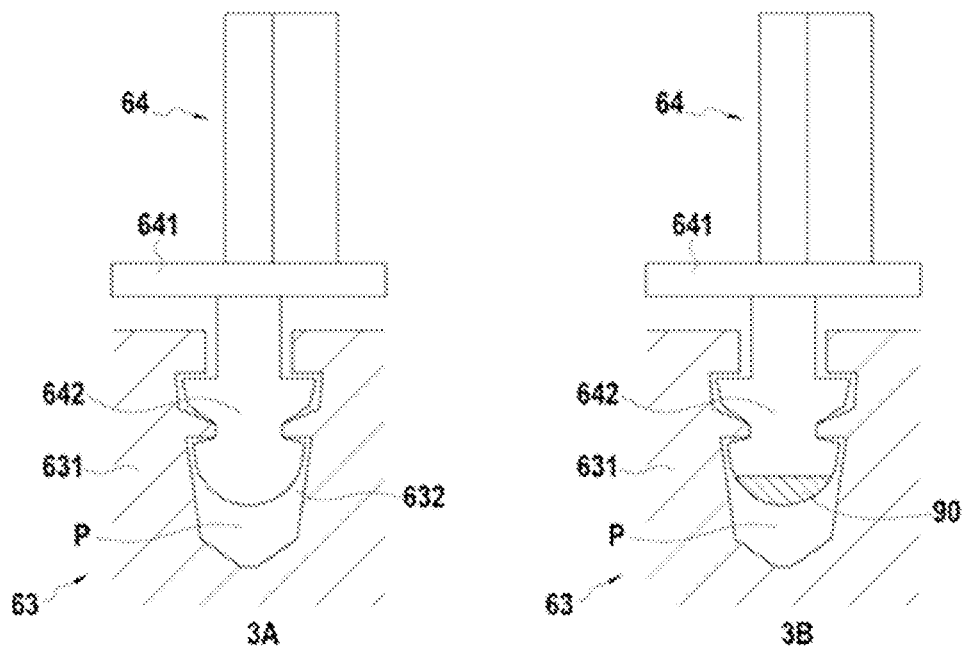
[Figure 4]
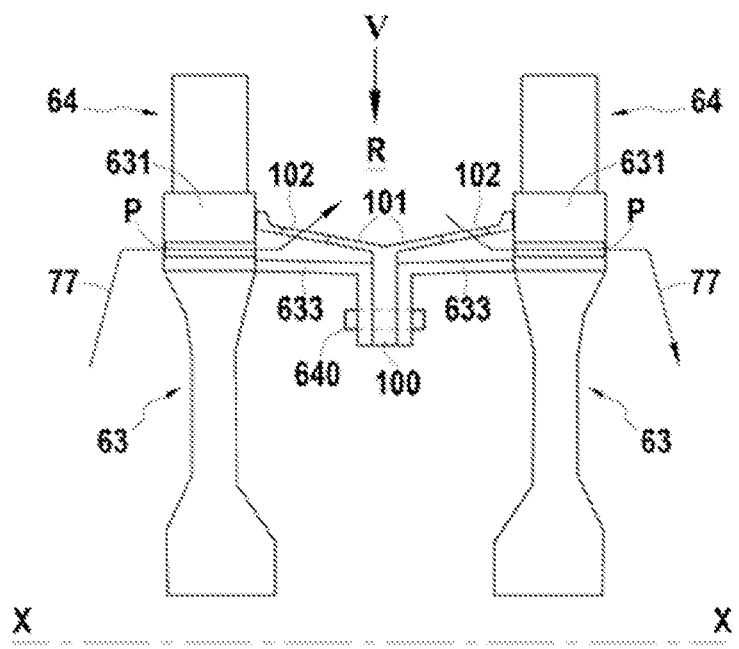

[Figure 5]
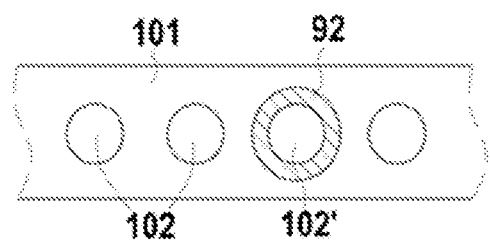

DEVICE FOR DETECTING COOLING ABNORMALITIES FOR AN AIRCRAFT TURBINE ENGINE

TECHNICAL FIELD

The invention relates to the field of turbine engines. More precisely, the invention relates to detecting cooling abnormalities of a turbine in an aircraft turbine engine.

PRIOR ART

In a turbine engine it is common to take off air on a compressor positioned upstream, for example a high-pressure compressor for cooling pieces in downstream stages having a warmer environment. The upstream and the downstream extend according to the direction of flow of the air in the turbine engine. The cooling air taken off on the high-pressure compressor is for example conveyed to the low-pressure turbine, or to the high-pressure turbine of the turbine engine. The conveyed air ensures a purge flow rate, allowing purging of hot air and ventilation of some pieces (ex: discs, mobile blades) of these turbines. Such a purge flow rate of hot air limits the introduction of hot air flowing in the primary vein and driving the blades of the rotor in rotation, in the zones located under said primary vein. In this way, the risks of overheating mobile pieces of turbines, which could result in degradation of the latter and in the worst case rupturing of these pieces, are limited.

Also, in light of ensuring that cooling devices comply with aeronautic standards, it is commonplace to oversize these cooling devices.

By way of example, it is possible to make a device comprising several channels for taking off air on the high-pressure compressor, these channels also ensuring circulation of the sampled air towards the low-pressure turbine or towards the high-pressure turbine to cool the latter. Such channels therefore form a cooling device of these turbines. Oversizing of this cooling device can then consist of producing channels having a diameter larger than necessary, these channels conveying more air than necessary for cooling the low-pressure or high-pressure turbine, or even increasing the number of channels. Advantageously, in the event of malfunction this oversizing ensures, for example in case of partial obstruction, partial boring or rupturing of a channel, that the device continues to deliver enough cooling air to the low-pressure or high-pressure turbine. Another example of malfunction can be caused by degradation of the tightness of the turbine, due for example to the wearing of a labyrinth joint of the low-pressure or high-pressure turbine, causing escape of cooling air and therefore a decrease in the purge flow rate of hot air.

Although reliable, the oversizing of cooling devices described hereinabove leads to taking off more air than really necessary on the high-pressure compressor in a nominal operating situation of the turbine engine, for example in the absence of breakdown of an air circulation channel, with such breakdowns also being exceptional. Such over-sampling of air impacts considerably on the specific fuel consumption (SFC) of the aircraft, and leads to degradation of engine performance. Devices for detecting malfunctions do exist, but generally need external intervention, increasing the risk of deterioration of pieces and of the engine.

It is therefore preferable to improve performance of the turbine engine, especially limiting the impact of cooling systems on fuel consumption of the aircraft, and limiting the risk of overheating of mobile pieces of turbines and deterioration of the latter.

SUMMARY OF THE INVENTION

To at least partly resolve the disadvantages mentioned hereinabove, the present disclosure relates to a turbine rotor for aircraft turbine engine comprising:
- at least one mobile disc supporting mobile blades, the mobile disc comprising a plurality of slots in which are inserted the roots of the mobile blades, a passage being formed between the bottom of the slots and the roots of the mobile blades inserted into said slots,
- a circulation channel configured to allow circulation of fluid, the circulation channel comprising said passage,
- a calibration device configured to allow flow of a first fluid flow rate in the circulation channel when the temperature within the circulation channel is less than a predetermined temperature threshold value, and to change state so as to allow flow of a second fluid flow rate, greater than the first flow rate, in the circulation channel, when the temperature within the circulation channel is greater than or equal to said predetermined temperature threshold value.

Throughout the disclosure, nominal operation of an engine, or of the rotor of the turbine designates operation wherein there is no breakdown of the cooling circuit of the turbine. It is understood that this nominal operation can comprise wearing of the turbine engine, but not cases of breakdowns such as rupture of an air supply channel.

In nominal operation, part of the purge flow rate moves to the circulation channel, especially in the passage existing between the bottom of the slots and the root of the mobile blades inserted into said slots. This passage can be the clearance existing between the bottom of the slot and the root inserted into said slot. The first fluid flow rate therefore corresponding to the cooling air flow circulating in the circulation channel, especially in said passage, in nominal operation conditions. These conditions are characterised by a temperature, within the circulation channel, staying below a threshold value.

Exceeding of this threshold value of the temperature is characteristic of insufficient cooling air flow, that is, a drop in the purge flow rate, engendered by an abnormality occurring in the cooling circuit of the turbine engine. Cooling circuit of the turbine engine means the circuit followed by the cooling air, from its sampling in the region of the compressor to its passage into the circulation channel of the rotor. Consequently, the defective element of the cooling circuit of the turbine engine can be an element in the region of the sampling of air on the compressor, one of the channels conveying the air from the compressor to the turbines, an air distributor box, passing of purges between the mobile blades and the fixed parts, and the dynamic joints between mobile and fixed parts of the turbine.

The occurrence of an abnormality engenders a decrease in the purge flow rate, and therefore an increase in the introduction of hot air coming from the primary vein. By entering the circulation channel this hot air boosts the temperature within the latter. Exceeding of the temperature threshold value causes a change in state of the calibration device, causing an increase of the fluid flow, in this case in point of the flow rate of hot air coming from the primary vein and flowing in the circulation channel, especially in the passage between the bottom of the slots and the root of the blades.

A change in state of the calibration device can comprise degradation of the latter, fusion, creep, or detachment of the latter.

The increase in flow rate, between the first flow rate and the second flow rate, causes a rise in temperature in the passage below the root of the blade, causing degradation of the latter. Because the root can no longer fulfil its function of retaining the mobile blade, the latter detaches from its mounting, and is released in the primary vein. As is known, a safety device called IFSD (for "In Flight Shut Down"), when a blade is released or detached, instantly creates dynamic imbalance triggering an alarm in the cockpit, prompting a user to immediately shut off the engine. This calibration device ensures release of at least one blade, causing the engine to stop, as of the initial effects of the breakdown, and well before degradation of the mobile disc due to reintroduction of hot gases coming from the primary vein.

It is accordingly possible, by way of detachment of a blade, to achieve stopping of the engine, and therefore detect the presence of a malfunction or breakdown, without the need for permanent oversizing of the cooling device. A device allowing automatic shutdown of the engine, in case of detachment of a blade, can also be provided. Such detection can be achieved without the need for outside intervention by an operator.

The impact of the cooling system on fuel consumption is therefore limited, effectively improving engine performance. Also, this configuration detects the presence of an abnormality without the need to add extra sensors such as a temperature sensor, for example.

In some embodiments, the calibration device comprises at least one part of the root of at least one mobile blade of the mobile disc.

The calibration device is therefore closest to the air flowing in the passage under the root of the blade. In this way, when an abnormality occurs which causes an increase of the introduction of hot air coming from the primary vein, detachment of the blade occurs more rapidly, allowing more effective detection of an abnormality. This especially limits the risk of degradation of the disc due to this abnormality, and to the rise in temperature which is the consequence.

In some embodiments, said part of the blade root is configured to shift from a first state wherein it has a first geometric structure, when the temperature within the circulation channel is less than the predetermined threshold value, to a second state wherein it has a second geometric structure different to the first geometric structure and causing an increase of the section of the passage existing between the bottom of the slots and the root of the mobile blades, when the temperature within the circulation channel is greater than or equal to said predetermined threshold value.

The first state corresponds for example to a so-called usual shape of the root of the blade, that is, the form which the root of a blade mounted on a rotor comprising no calibration device would have. The second state corresponds to deformation caused by creep of this part, or again partial or complete detachment of the latter. In other terms, the form of the second geometric structure is such that the bypass section resulting from this deformation is larger than the initial bypass section, when said part of the blade root presents the first geometric structure. This change in geometry consequently amounts to an increase in the clearance existing between the root of the blade and the bottom of the slot. This shift from the first to the second state, caused by exceeding of the threshold temperature value, allows a rise in the flow rate of hot air in the passage under the blade root. The resulting rise in temperature causes degradation of the root of the blade, also already embrittled by the change in state of said part of the root of the blade, and accordingly detachment of the latter.

In some embodiments, said part of the blade root comprises a fusible material configured to melt at least in part when the temperature within the circulation channel reaches the predetermined threshold value.

In other terms, the predetermined threshold value corresponds to the melting temperature of the part of the blade root comprising the fusible material. The material of the part of the blade root must therefore preferably be selected such that its melting temperature is less than the critical temperature from which the elements of the turbine such as the disc deteriorate. In this way, in case of partial melting, causing creep of the part of the blade root, or total melting, said part of the blade root shifts from the first state wherein it has the first geometric structure to a second state wherein it has a second geometric structure, causing a rise in flow rate of hot air, and therefore detachment of the blade.

In some embodiments, the rotor comprises an annular wall extending axially between two mobile discs of the rotor, the annular wall comprising a plurality of circulation orifices, the circulation channel comprising said plurality of orifices, the calibration device comprising at least one fusible washer fixed on at least one circulation orifice of the plurality of orifices.

Preferably, each circulation orifice of the annular wall is positioned opposite the root of a mobile blade, such that air flowing in the passage under the blade root then passes through said orifice, the circulation channel in this way comprising said passage and said orifice. The air moving through each of these orifices especially provides cooling air to the region positioned above the annular wall and below a stator blade.

Also, the calibration device can comprise the fusible washer in place of the fusible part of the blade root, or in addition to the latter. According to the same mechanism as that described earlier, a rise in temperature of air flowing in the circulation channel, especially in the passage under the blade root then through the orifice to which the fusible washer is fixed, engenders modification of the state of this washer, and especially an increase in the diameter of the orifice to which the washer is fixed. This increase in diameter creates an increase of the flow rate of hot air in the case of an abnormality, and consequently, detachment of the blade.

In some embodiments, said fusible washer is configured to shift from a first state wherein it has a first geometric structure defining the diameter of the circulation orifice on which it is fixed, when the temperature within the circulation channel is less than the predetermined threshold value, to a second state wherein it has a second geometric structure different to the first geometric structure and causing an increase in the diameter of said orifice, when the temperature within the circulation channel is greater than or equal to said predetermined threshold value.

In the first state, the fusible washer can have a shape allowing the orifice to which the washer is fixed to have a diameter identical to the diameter of the other orifices of the annular wall comprising no fusible washer. The second state corresponds to a form in which the diameter of said orifice is augmented.

In some embodiments, said fusible washer comprises fusible material configured to melt at least in part when the temperature within the circulation channel reaches the predetermined threshold value.

The fusible material of the fusible washer can be different to the material of the fusible part of the blade root, and present a different range of melting temperatures.

In some embodiments, the rotor comprises a plurality of mobile discs, the calibration device being positioned on an upstream mobile disc of the plurality of mobile discs, the upstream mobile disc being positioned upstream of the plurality of mobile discs according to the direction of flow of hot air along the axis of rotation of the rotor.

Since the upstream disc is the first stage of the discs to be exposed to hot air in the event of malfunction of the hot air purge, the fact of positioning the calibration device on this upstream disc allows this device to change state faster in the event of a rise in temperature due to an abnormality, and then improve the efficacy of detecting such an abnormality by release of at least one blade.

In some embodiments, the threshold temperature value is between 700 and 850° C.

In some embodiments, a first threshold temperature value, corresponding to a melting temperature of the fusible part of the blade root, is between 700 and 780° C., and a second threshold temperature value, corresponding to a melting temperature of the fusible washer, is between 800 and 850° C.

This temperature threshold is preferably less than a critical temperature from which the elements of the turbine such as the roots of the blades and the disc deteriorate. In this way, when the threshold temperature value within the circulation channel is reached, the change in state of the calibration device and release of the blades concerned cause the engine to stop before the disc bearing the blades deteriorates.

The present disclosure also relates to a turbine for aircraft turbine engine comprising an annular vein of hot air flow and the rotor according to any one of the foregoing embodiments.

The hot air flowing in the annular vein is the air coming from the combustion of the engine of the turbine engine, and driving the blades of the rotor of the turbine.

BRIEF DESCRIPTION OF THE DRAWINGS

The invention and its advantages will be more clearly understood from the following detailed description of different embodiments of the invention given by way of non-limiting examples, said description making reference to the pages of appended figures in which:

FIG. 1 is a view in longitudinal section of a turbine engine equipped with an injection device;

FIG. 2 illustrates a view in longitudinal and partial section of a low-pressure turbine in a turbine engine according to the present disclosure;

FIG. 3A illustrates a view in a sectional plane perpendicular to the longitudinal direction of a mobile blade root of a turbine according to the present disclosure, without calibration device, and FIG. 3B illustrates a view in a sectional plane perpendicular to the longitudinal direction of a mobile blade root of a turbine according to the present disclosure, with calibration device;

FIG. 4 illustrates a detailed view of an upstream stage of the low-pressure turbine of FIG. 2;

FIG. 5 illustrates a plan view, according to the direction V, of an annular wall of the upstream stage of FIG. 4.

DESCRIPTION OF EMBODIMENTS

The terms "upstream" and "downstream" are defined hereinbelow relative to the direction of flow of gases through a turbine engine, indicated by arrow F in FIG. 1.

FIG. 1 illustrates a dual-flow turbine engine 100 comprising as is known from upstream to downstream successively at least one fan 10, an engine part comprising successively at least one low-pressure compressor stage 20, high-pressure compressor stage 30, a combustion chamber 40, at least one high-pressure turbine stage 50 and a low-pressure turbine stage 60.

Rotors, turning around the principal axis X of the turbine engine 100 and able to be coupled together by different transmission and gear systems, correspond to these different elements.

As is known, a fraction of air is sampled on the high-pressure compressor 30 and is conveyed by means of one or more cooling conduits 32 for cooling warmer zones of the turbine engine 100, especially the high-pressure turbine 50 and the low-pressure turbine 60.

FIG. 2 is an enlargement of a zone of the turbine engine 100, in a simplified way illustrating the upstream part of the low-pressure turbine 60. Even though the rest of the description makes reference to the low-pressure turbine 60, for simplification purposes this example is not limiting, with the invention also applying to the high-pressure turbine 50.

The low-pressure turbine 60 illustrated here comprises a plurality of turbine stages 61, 62. A first stage 61, as well as the stages 62 located downstream of the latter comprise respectively a set of fixed distributors 70 and 65. Each stage 61, 62 also comprises mobile discs 63 on which is mounted a set of blades 64 fixed in slots positioned in a rim of the discs 63, the blades 64 being driven in rotation by the mobile disc 63. The mobile discs 63 are fixed axially to each other along the principal axis X to form the different stages 61, 62 of the turbine 60.

The first stage 61 of the low-pressure turbine 60 comprises at least one upstream mobile disc 63a, as well as at least one hollow distributor 70, in which cooling air circulates. In the example illustrated in FIG. 2, the distributor 70 is hollow to allow cooling air to pass through, exiting by means of an injection device 80 associated with the distributor 70, comprising a plurality of injectors 81. The following stages 62 located downstream of the first stage 61 of the low-pressure turbine 60, each comprise at least one mobile blade 64 and a distributor 65, or stator, in the form of fixed blading. The discs 63 mobile are solid in rotation with a low-pressure shaft extending according to the axis X, while each stator 65 is connected to the casing 66 of the turbine.

The turbine engine comprises a cooling device for conveying, via the cooling conduit 32, the fraction of air sampled on the high-pressure compressor 30 to at least one stage of the low-pressure turbine 60. In the embodiment described hereinbelow, the fraction of sampled cooling air is distributed in the region of a downstream stage of the high-pressure turbine 50 (not shown) and an upstream stage of the low-pressure turbine 60. The high- and low-pressure turbines 50, 60 are cooled in this way. But the invention is not limited to this embodiment, the fraction of sampled air also able to be distributed to other turbine stages.

In the embodiment illustrated in FIG. 2, the fraction of air taken off in the high-pressure compressor 30 flows into the cooling conduit 32, then into the hollow distributor 70. The direction of circulation of the fraction of air through the hollow distributor 70 is illustrated by arrows 71. The fraction of air is then injected via the injectors 81 into a cavity under the vein 68. The distributed air especially cools the discs 63 of the turbine, as shown by arrows 75.

The injection device 80 comprises a plurality of injectors 81 distributed over a wall of the distributor 70 around the axis X. To simplify the description of this embodiment, a single injector 81 is shown in FIG. 2. The injector 81 is an orifice made in the wall of the distributor 70, for injecting ongoing, that is, continuously when the turbine engine is in operation, a cooling air flow in the cavity under vein 68. This flow rate ensures the temperature of the low-pressure turbine 60 is maintained in conditions of nominal operation of the latter, that is, in the absence of one of the malfunctions mentioned hereinabove. The dimensions of the orifice are determined so that the flow rate is for example between 270 and 310 g/s.

More precisely, the cooling air injected via the injectors 81 allows purging of the hot air present in the low-pressure turbine 60, therefore ensuring the cooling of the latter. The cooling air taken off in the high-pressure compressor 30 and conveyed as far as into the cavity under vein 68 constitutes a pressure barrier, or purge, preventing hot air coming from the combustion chamber and flowing in the primary air circulation vein of the turbine engine 100, from entering the cavity under vein 68 in the space between the rotors and stators of the turbine. Primary vein means the principal air circulation vein of the turbines, illustrated by arrow F in FIG. 2. The purge of the hot air of the low-pressure turbine 60 is symbolised here especially by arrow 76. The risks of overheating of the rotors of turbines are accordingly limited. In particular, by preventing the air of the primary vein from returning to the cavity under vein 68, this cavity is less warm than the vein, and the turbine rotors can therefore resist higher centrifuge forces and be dimensioned on lower limit constraints.

FIG. 3A schematically illustrates a detailed view in a section perpendicular to the axis X, that is, a frontal view, of a radially external end of a disc 63, especially a slot 632 formed between two teeth 631 of the disc 63. The blades 64 each comprise a root 642, separated from the rest of the blade by a platform 641, and having a form complementary to that of the slot 632, into which it can insert. Air also circulates in the passage P formed between the root 642 of the blades 64, and the bottom of the slots 632 into which the roots 642 are inserted. The passage P is on a cooling air channel. This circulation channel, comprising the passage P, in which a current of air illustrated by arrow 77 circulates, cools these zones of severely restricted blade roots.

FIG. 4 schematically illustrates a detailed lateral view, that is, perpendicular to the axis X, of two mobile discs 63 of the low-pressure turbine 60. The discs 63 of the rotor are fixed to each other by bolting of annular flanges 633 extending axially in the direction of each other from each disc 63. A substantially cylindrical and annular wall 101 also extends between two adjacent discs 63. The wall 101 is formed at the radially external end of a radial wall 100 interposed in between the two annular flanges 633 and fixed by means of the fastening bolts 640 of the annular flanges 633. This annular wall 101 especially bears the tabs (not shown) making contact with an abradable layer borne by a stator 65.

The wall 101 comprises a plurality of orifices 102. The circulation channel also comprises these orifices 102, through which the cooling air current 77 can flow, in the case of nominal operation, or of hot air, in case of abnormality.

These orifices 102 especially calibrate the cooling air flow passing through the passage P, especially by having a bypass section smaller than the passage P. In particular, an orifice 102 can be positioned opposite each root 642 of the blades 64. During nominal operation the cooling air circulation channel, comprising the passage P and the orifices 102, also limits the reintroduction of hot gases coming from the primary vein of hot air flow, in the region R between the wall 101 and the platform (not illustrated) supporting the fixed blades of the stator 65.

A malfunction of the cooling of turbines can have several causes. One cause of the malfunction of the cooling can be the malfunction of a conduit 32, for example rupture or accidental blocking of one of the conduits 32 for circulation of air. Another cause of this malfunction can result from excessive wear or rupture of one or more sealing joints, or dynamic joint of the low-pressure turbine 60. A malfunction of the cooling of the turbine 60 results by way of example from breakdown of a labyrinth joint 69 between the stator part and the rotor part, ensuring isolation under pressure of the cavity under the vein 68 of the low-pressure turbine 60.

The rotor of the low-pressure turbine 60 comprises a calibration device for calibrating the air flow rate of the current 77 flowing in the circulation channel, as described hereinbelow.

In a first embodiment, the calibration device comprises a portion, called "fusible portion 90". FIG. 3B is a view similar to that of FIG. 3A. According to this view, the portion 90 of at least one root 642 of the blade 64 comprises a material different to the material of the rest of the root 642 and of the blade 64. The portion 90 comprising the different material, called "fusible portion 90", can be a portion delimiting the passage P with the bottom of the slot 632. In particular, the portion 90 can be a lower portion of the root 642, that is, the portion closest the bottom of the slot 632, representing at least ¼ of the total volume of the root 642, preferably at least ⅓, preferably even at least half. This portion 90 of the root 642 can be fixed to the rest of the root 642 by brazing.

Also, FIGS. 3A and 3B illustrate an example wherein the roots 642 have the shape of a fir tree stem. However, this example is not limiting, whereby the invention can apply to other forms of blade roots, for example a dovetail shape.

The fusible portion 90 can comprise, for example, eutectic material comprising 72% silver and 28% copper, and can have a melting temperature, or creep temperature of 780° C. This melting temperature, and consequently the material selected for the fusible portion 90, is determined so that in conditions of nominal operation the temperature within the circulation channel stays below this melting temperature of the fusible portion 90. In this way, in conditions of nominal operation, the fusible portion 90 has a constant form for maintaining a constant cross-section of the passage P and therefore a constant flow rate in the circulation channel.

Whenever one of the malfunctions mentioned hereinabove occurs, the purge flow rate drops, causing the introduction of hot gases coming from the primary vein, these hot gases able to be introduced to the circulation channel, especially in the passage P. The temperature within the circulation channel then rises and reaches values greater than the temperatures representative of nominal operation.

When the temperature within the circulation channel reaches the melting temperature of the fusible portion 90, the later melts at least in part and/or deforms under the effect of creep, causing modification of the cross-section of the passage P, especially its increase. The increase in the cross-section of the passage P causes a rise in the flow rate of the current 77 of hot air coming from the primary vein in the circulation channel. The effect of this increase of the flow rate of hot air is to substantially and quasi-instantly raise the temperature in this zone of the blade root, causing rapid degradation of the roots 642 of the blades 64 in question. The roots 642 can no longer carry out their function of holding the blades 64, causing release of these blades 64 in the primary vein.

As is known, in the event where a blade is released or detached, a safety device called IFSD (for "In Flight Shut Down") instantly creates dynamic imbalance triggering an alarm in the cockpit, prompting a user to immediately shut off the engine. In such a situation, the low-pressure turbine 60 casing is configured to retain the blades 64 which have detached inside the engine, avoiding degradation of other parts of the turbine engine. The number of blades 64 called "fusible blades", that is, blades whereof the root 642 comprising a fusible portion 90 is not limited, one, two or more of them can be equipped with them. Also, according to this embodiment, the fusible portion or the portion 90 are positioned on the blades 64 of the upstream disc 63a. The fusible portion 90 is therefore fixed in the turbine most closely to the current 76 of purge of hot air of the low-pressure turbine 60.

According to a second embodiment, the fusible portion 90 is a first fusible portion, the rotor of the low-pressure turbine 60 comprising a second fusible portion 92. According to this second embodiment, the calibration device comprises the second fusible portion 92. More precisely, at least one of the orifices 102 of the wall 101 acts as a fusible orifice 102'. In nominal operation of the turbine, this fusible orifice 102' has a diameter identical to the diameter of the other orifices 102. However, the contour of this fusible orifice 102' is delimited by the second fusible portion 92, having the form of a ring, or washer, of internal diameter equal to the diameter of the other orifices 102, and of external diameter equal to at least 1.5 times the internal diameter, preferably at least 1.8 times the internal diameter. The second fusible portion 92 can be fixed by brazing to the wall 101.

It is also evident that the second fusible portion 92 preferably comprises material different to the first fusible portion 90, and having a higher melting temperature.

In this way, in conditions of nominal operation, the fusible portion 92 has a constant form for keeping the diameter of the orifice 102' constant and equal to the diameter of the orifices 102 not equipped with the second fusible portion 92. In this way a substantially constant flow rate in the circulation channel can be maintained.

When one of the malfunctions mentioned hereinabove occurs, the purge flow rate drops, causing the introduction of hot gases coming from the primary vein, these hot gases able to be introduced to the circulation channel, especially to the passage P, then through the orifices 102 and 102'. The temperature within the circulation channel rises and reaches values greater than the temperatures representative of nominal operation.

When the temperature within the circulation channel reaches the melting temperature of the second fusible portion 92, the latter melts at least in part and/or deforms under the effect of creep, causing modification of the diameter of the orifice 102', especially its increase. The increase in diameter of the orifice 102' causes an increase in the flow rate of the current 77 of hot air, coming from the primary vein, in the circulation channel.

The effect of this increase of the flow rate of hot air is to substantially and quasi-instantly boost the temperature in this zone of the blade root, causing rapid degradation of the roots 642 of the blades 64 in question. The consequences described hereinabove, in the case of the first fusible portion 90, also occur.

Also, the number of orifices 102' called "fusible orifices", that is, those orifices 102' comprising the second fusible portion 92, is not limited, one, two or more of them able to be equipped with them.

In addition, one or the other of the first or second fusible portion 90, 92 can be utilised. Alternatively, the first and second embodiment can be combined, the first and the second fusible portion 90, 92 able to be used simultaneously.

Although the present invention has been described by referring to specific exemplary embodiments, it is evident that modifications and changes can be made to these examples without departing from the general scope of the invention such as defined by the claims. In particular, individual characteristics of the various embodiments illustrated/mentioned can be combined in additional embodiments. Consequently, the description and the drawings must be considered in an illustrative rather than restrictive sense.

The invention claimed is:

1. A turbine rotor for aircraft turbine engine comprising:
    at least one mobile disc supporting mobile blades, the mobile disc comprising a plurality of slots in which are inserted roots of the mobile blades, a passage being formed between a bottom of the slots and the roots of the mobile blades inserted into the slots,
    a circulation channel configured to allow circulation of fluid, the circulation channel comprising said passage,
    a calibration device configured to allow flow of a first fluid flow rate in the circulation channel when the temperature within the circulation channel is less than a predetermined temperature threshold value, and to change state so as to allow flow of a second fluid flow rate, greater than the first flow rate, in the circulation channel, when the temperature within the circulation channel is greater than or equal to said predetermined temperature threshold value, the calibration device comprising a fusible material configured to melt at least in part when the temperature within the circulation channel reaches the predetermined threshold value.

2. The rotor according to claim 1, wherein the calibration device comprises at least one part of the root of the mobile blades of the mobile disc.

3. The rotor according to claim 2, wherein the at least one part of the root is configured to shift from a first state wherein it has a first geometric structure, when the temperature within the circulation channel is less than the predetermined threshold value, to a second state wherein it has a second geometric structure different to the first geometric structure and causing an increase of the section of the passage existing between the bottom of the slots and the root of the mobile blades, when the temperature within the circulation channel is greater than or equal to said predetermined threshold value.

4. The rotor according to claim 2, wherein the at least one part of the root comprises the fusible material.

5. The rotor according to claim 1 comprising an annular wall extending axially between two mobile discs of the rotor, the annular wall comprising a plurality of circulation orifices, the circulation channel comprising the plurality of orifices, the calibration device comprising at least one fusible washer fixed on at least one circulation orifice of the plurality of orifices.

6. The rotor according to claim 5, wherein the fusible washer is configured to shift from a first state wherein it has a first geometric structure defining a diameter of the at least one circulation orifice on which the at one fusible washer is fixed, when the temperature within the circulation channel is less than the predetermined threshold value, to a second state wherein it has a second geometric structure different to the first geometric structure and causing an increase in the diameter of the at least one circulation orifice, when the temperature within the circulation channel is greater than or equal to the predetermined threshold value.

7. The rotor according to claim 5, wherein the fusible washer comprises the fusible material.

8. The rotor according to claim 1, comprising a plurality of mobile discs the calibration device being positioned on an upstream mobile disc of the plurality of mobile discs, the upstream mobile disc being positioned upstream of the plurality of mobile discs according to the direction of flow of hot air along the axis of rotation of the rotor.

9. The rotor according to claim 1, wherein the threshold temperature value is between 700 and 850° C.

10. A turbine for aircraft turbine engine comprising an annular vein of hot air flow and the rotor according to claim 1.

\* \* \* \* \*